United States Patent [19]
Pickett et al.

[11] Patent Number: 5,761,278
[45] Date of Patent: Jun. 2, 1998

[54] INTEGRATED DATA COLLECTION AND TRANSMISSION FOR 9-1-1 CALLS FOR SERVICE

[75] Inventors: David L. Pickett, Houston; John R. Melcher, Pasadena, both of Tex.

[73] Assignee: Greater Harris County 9-1-1 Emergency Network, Houston, Tex.

[21] Appl. No.: 807,348

[22] Filed: Feb. 28, 1997

Related U.S. Application Data

[63] Continuation of Ser. No. 160,072, Nov. 29, 1993, abandoned.

[51] Int. Cl.⁶ .................................................. H04M 11/00
[52] U.S. Cl. .................... 379/90.01; 379/142; 379/45; 340/311.1; 340/825.44; 455/31.2
[58] Field of Search .................... 379/38, 41–46, 379/49, 51, 93, 96, 97, 93.17, 93.18, 93.23, 93.26, 93.27, 93.01, 90.01, 142; 455/31.2; 360/99.04; 371/37.4; 340/825.44, 311.1

[56] References Cited

U.S. PATENT DOCUMENTS

| | | | |
|---|---|---|---|
| 3,975,768 | 8/1976 | Jacques et al. | 360/99.04 |
| 4,510,546 | 4/1985 | Asami et al. | 371/37.4 |
| 4,893,325 | 1/1990 | Pankonen et al. | 379/45 |
| 5,043,721 | 8/1991 | May | 340/825.44 |
| 5,077,788 | 12/1991 | Cook et al. | 379/142 |
| 5,128,979 | 7/1992 | Reich et al. | 379/38 |
| 5,195,126 | 3/1993 | Carrier et al. | 379/45 |
| 5,262,860 | 11/1993 | Fitzpatrick et al. | 379/97 |
| 5,305,370 | 4/1994 | Kearns | 379/38 |
| 5,337,044 | 8/1994 | Folger et al. | 340/825.44 |
| 5,339,351 | 8/1994 | Hoskinson et al. | 379/49 |
| 5,347,268 | 9/1994 | Nelson et al. | 340/825.44 |
| 5,347,567 | 9/1994 | Moody et al. | 379/45 |
| 5,398,280 | 3/1995 | MacConnell | 379/93 |
| 5,426,594 | 6/1995 | Wright et al. | 379/96 |
| 5,481,255 | 1/1996 | Albert et al. | 340/825.44 |
| 5,487,100 | 1/1996 | Kane | 379/96 |

OTHER PUBLICATIONS

Japanese Patent Abstract Publication No. JP61286973, publication date Dec. 17, 1986.
Japanese Patent Abstract Publication No. JP612230233, publication date Oct. 081987.
PCT Application No. PCT/US90/04512, International Publication No. WO 91/03118, Publication date Mar. 07, 1991.
PCT Application No. PCT/US91/07688, International Publication No. WO 92/07439, Publication date Apr. 30, 1992.

*Primary Examiner*—Wing F. Chan
*Attorney, Agent, or Firm*—Arnold, White & Durkee

[57] ABSTRACT

A system for integrated data delivery in 9-1-1 calls for service application. Specifically, the invention describes a machine executed method to provide: 1) the ability to capture and utilize decoded caller data—caller data could be in the format of dual tone multifrequency, multifrequency, or frequency shift keying coding formats; 2) automatically interrogate one or more computer databased using caller data (telephone number) as a search key: 3) intergrate and format the caller information as it is returned by the database search—such information could include the address of the caller, the geopolitical jurisdiction information (e.g., the police, fire, or ambulance service responsible for a particular geographic area), and the ability to integrate this information plus any additional information provided by the calltaker; 4) automatically tramsmit the integrated data via a leased or a dial up telephone line to a radio common carrier such as a paging service for broadcast to the end-user.

13 Claims, 3 Drawing Sheets

INTEGRATED DATA COLLECTION AND TRANSMISSION FOR 9-1-1 CALLS FOR SERVICE

This application is a continuation of the application Ser. No. 08/160,072 filed Nov. 29, 1993 now abandoned.

TABLE OF CONTENTS

1. BACKGROUND OF THE INVENTION
2. SUMMARY OF THE INVENTION
3. BRIEF DESCRIPTION OF THE DRAWINGS
4. DETAILED DESCRIPTION OF SPECIFIC EMBODIMENT
 4.1 Calling Party identification Process
 4.2 Summary
 4.3 Potential Uses of Invention
5. APPENDIX A
6. CLAIMS
 ABSTRACT

1. BACKGROUND OF THE INVENTION

FIG. 1 shows a prior art system which embodies essential features of an existing 9-1-1 service. In prior embodiments of the 9-1-1 service, a citizen 100 dials 9-1-1 and is connected to one of a number of possible central offices 105 on a centralized automatic office accounting (CAMA) service with dedicated trunking to a Tandem router 110. Tandem router 110 routes the call using emergency service numbers (ESN) resident in a software program to a predesignated public safety answering point 120.

The automatic number identification (ANI) controller 125 decodes the incoming phone call's multi-frequency (MF) tones and enables the ANI controller 125 to out-pulse a query to the automatic location Identification 130 tariffed controller. The automatic location identification (ALI) 130 sends a request to the remote data base service (RDBS) 140 maintained by Southwestern Bell. The RDBS 140 stores all the records of the citizen location. The ASCII request is received by the site ALI controller 130.

The Greater Harris County (Texas) 9-1-1 Emergency Network (herein after referred to as "Network") installed Digital Equipment Corporation Microvax 3100's at Houston Police, Houston Fire, 9-1-1 City Neutral, and 9-1-1 Harris County sites. Operational software resides at all locations where VAX 3100's are installed.

At the host site (e.g., County Neutral) a Network-owned Northern Telecom SL1 option 61 digital voice 160 telephone switch is installed. The calltaker position number is taken from the ALI controller 130 via and given to the computer 150 where certain software tables control the ALI data flow (address of the citizen) to be delivered to the call taker position, following the assigned position of voice connectivity.

To better serve the smaller volunteer fire and emergency medical service (EMS) agencies, the computer 150 at the host site is connected via dial-up telephone line to a commercial radio common carrier service (for example Pagenet 156) for radio frequency (RF) transmission of the formatted data to various volunteer agencies equipped with belt pagers such as "OPTRIX" 159 manufactured by Motorola. Dial-up telephone lines are installed at some of these remote volunteer sites with modems attached for "data dumps" of ALI data to those sites.

The prior art system described in FIG. 1 was designed to provide information to agencies which did not qualify as a jurisdiction under Texas Law creating the Greater Harris County 9-1-1 Emergency Network (a communication district). The system of FIG. 1 has several shortfalls which include: 1) an unacceptable delay caused by modem, 155 and 157, dial-up time and connectivity and the associated setup time within the computer 150; 2) extremely poor reliability; 3) lack of integration capability to computer assisted dispatch systems; and 4) cumbersome data entry by the calltaker 170.

The machine executed method of the invention addresses these shortfalls by providing a faster, more cost efficient system with a very high level of reliability. The described invention utilizes an alphanumeric based pager and several new software programs.

2. SUMMARY OF THE INVENTION

The invention is a machine executed method—embodied in a series of computer programs—that provides:

1) The ability to capture and utilize decoded caller data. Caller data could be in the format of dual tone multifrequency, multifrequency, or frequency shift keying coding formats.

2) Automatically interrogate one or more computer databases using caller data (telephone number) as a search key.

3) Integrate and format the caller information as it is returned by the database search. Such information could include the address of the caller, the geopolitical jurisdiction information (e.g., the police, fire, or ambulance service responsible for a particular geographic area). The ability to integrate this information plus any additional information provided by the calltaker.

4) Automatically transmit the integrated data via a leased or a dial up telephone line to a radio common carrier such as a paging service for broadcast to the end-user.

3. BRIEF DESCRIPTION OF THE DRAWINGS

Figure 3A:
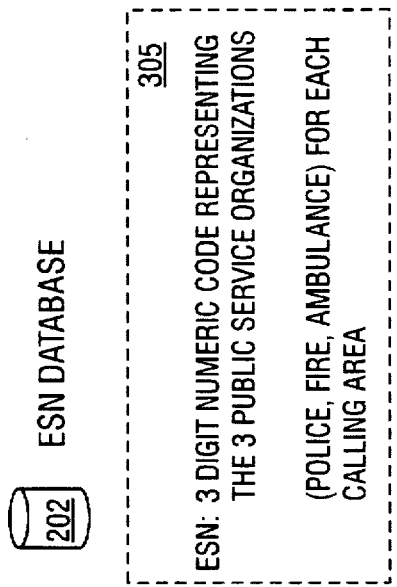
Figure 3B:
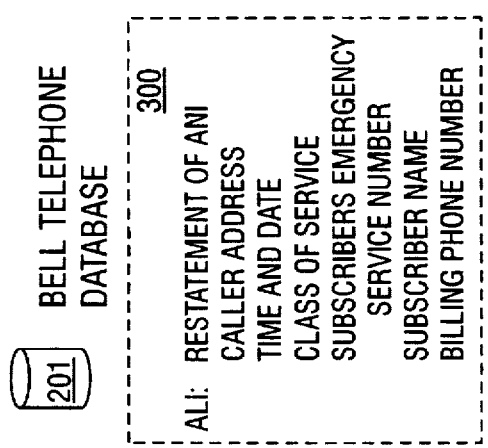
Figure 3C:
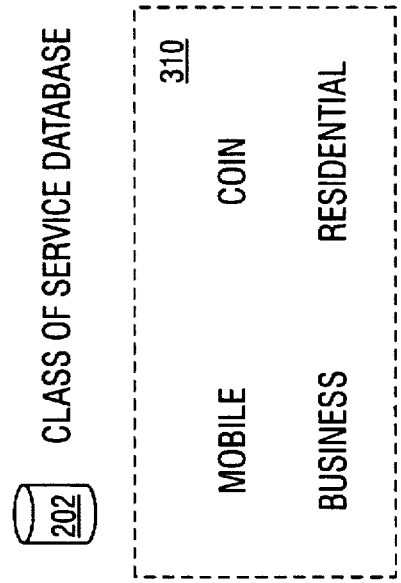

FIG. 3 outlines some of the information contained in three of the databases used by the invention.

4. DETAILED DESCRIPTION OF SPECIFIC EMBODIMENT

One illustrative embodiment of a the invention is described below as it might be implemented on a general purpose computer using a suitable high-level language such as COBOL, C, Pascal, or Fortran. In the interest of clarity, not all features of an actual implementation are described in this specification. It will of course be appreciated that in the development of any such actual implementation (as in any software development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Appendix A sets out selected COBOL source code extracts from a copyrighted software program, owned by the assignee of this patent document, which manifests the invention. Permission is granted to make copies of the appendix solely in connection with the making of facsimile copies of this patent document in accordance with applicable law; all other rights are reserved, and all other reproduction, distribution, creation of derivative works based on the contents, public display, and public performance of the appendix or any part thereof are prohibited by the copyright laws.

Figure 1:
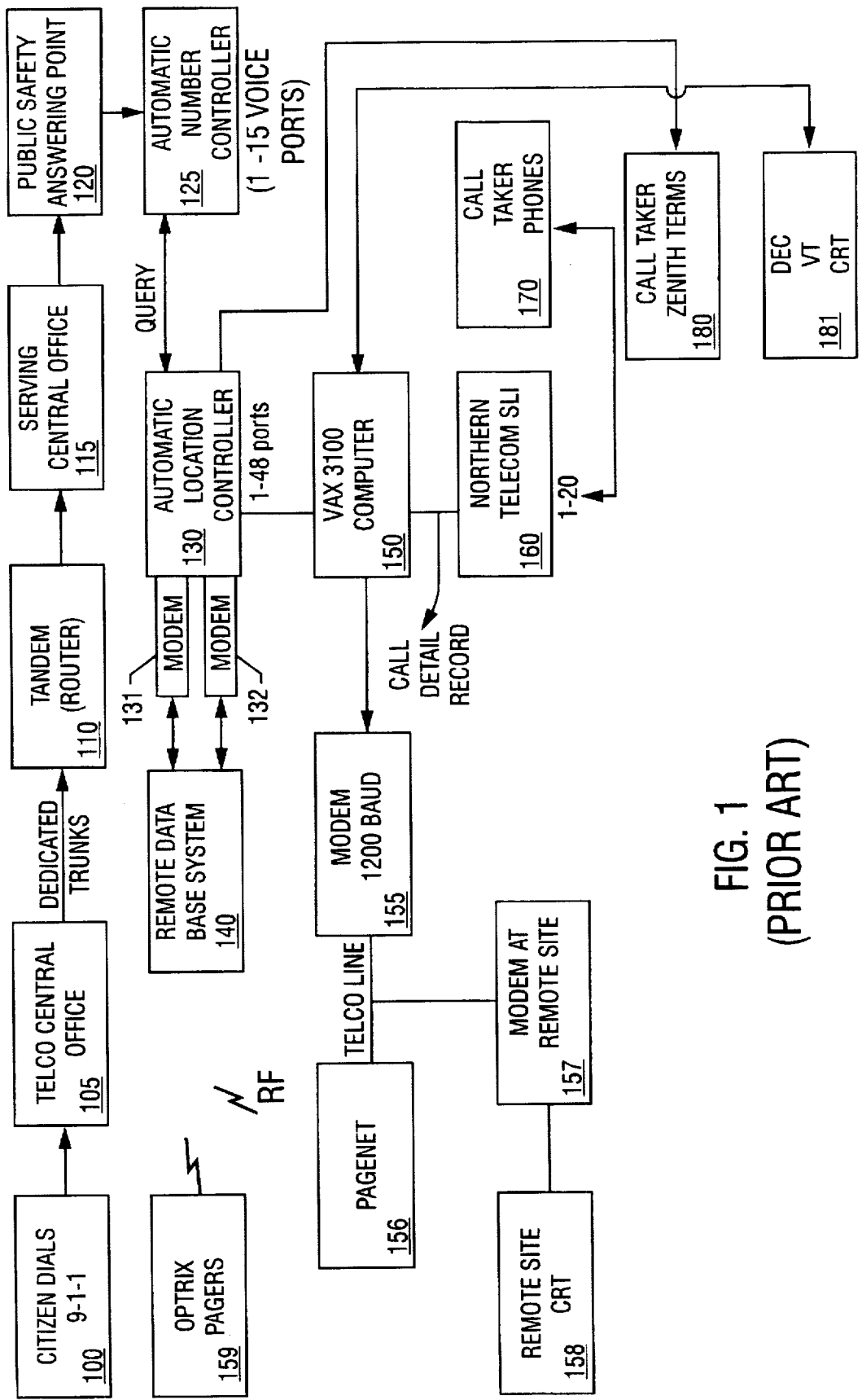
FIG. 1 is a block diagram representation of a prior art system for providing 9-1-1 caller information service.
Figure 2:
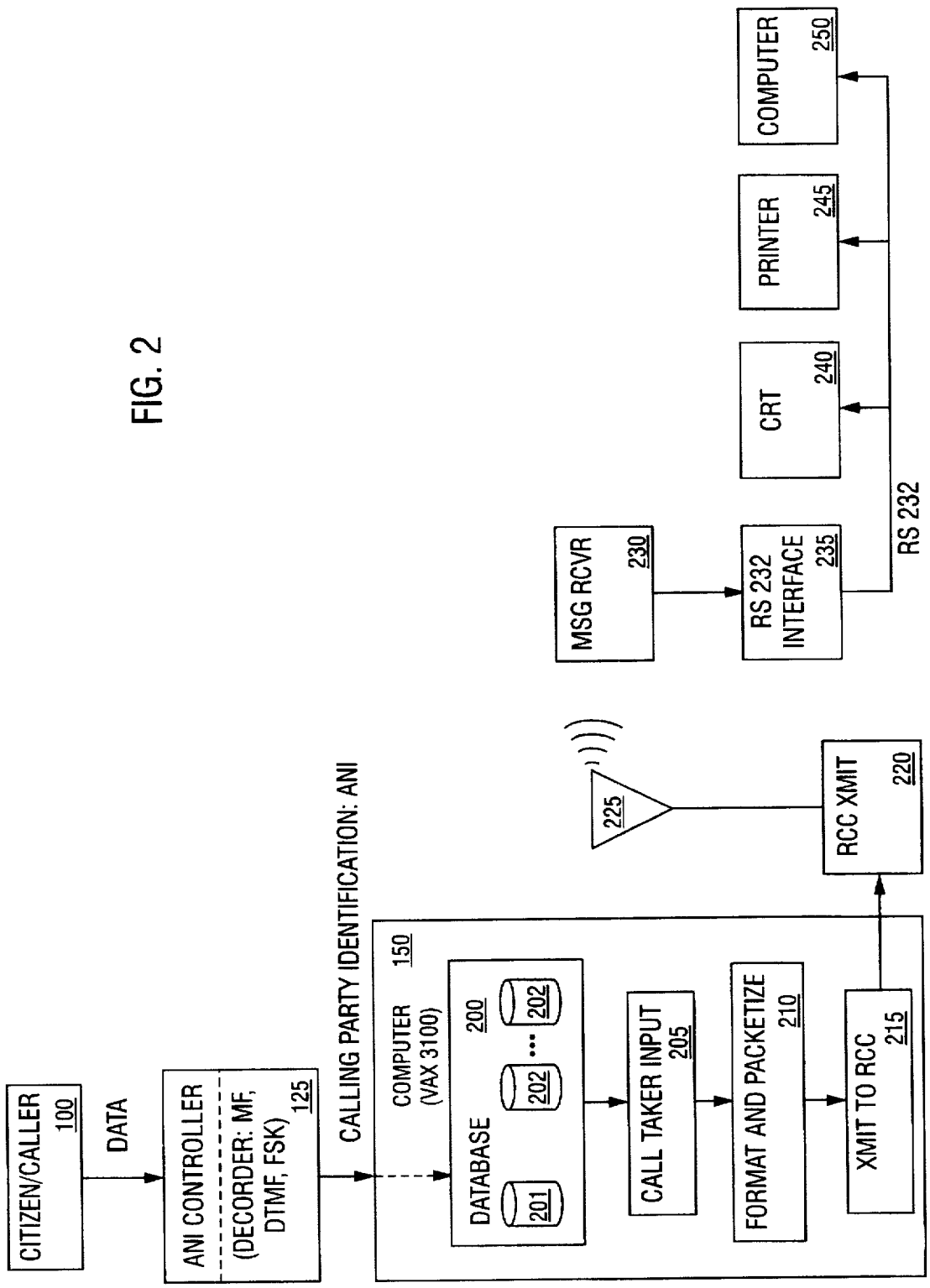
FIG. 2 is a flow diagram of the invention's calling party identification and information integration process.

The functional aspects of a machine executed method implementing the caller data processing aspects of the invention is captured in FIG. 2. The citizen/caller 100 makes a telephone call which is answered at a primary service answering point, e.g., 9-1-1 County Neutral. The caller's telephone number is decoded and passed to the computer 150. (Computer 150 could be, for example, a Digital Equipment Corporation Microvax 3100, a personal computer, or other type of minicomputer.) In the current embodiment of the invention, the caller identification is decoded from an inband multifrequency (MF) signal by an ANI controller 125. However, the calling party identification information could be encoded, for example, in a dual tone multifrequency (DTMF) or frequency shift keying (FSK) format.

The computer 150 uses the calling party identification (ANI) to query one or more databases. In this embodiment the first database queried is the telephone company Data Management System or ALI (automatic location information) database. The information returned is then parsed into several fields of concern. Depending on the results gathered from the database 201, other databases 202 are searched.

Results from each database search are then merged with calltaker input 205, for example free text comments, formatted and then transmitted 215 to a radio common carrier (RCC) or paging company. The radio common carrier prioritizes the data 220 and sends it to their broadcast towers 225 where the data is then broadcast via RF (radio frequency).

The broadcast data is received and decoded by an alphanumeric message receiver 230 such as a Motorola Adviser message receiver. The message receiver 230 is connected to an RS-232 interface 235 (e.g., a Motorola Print Pal). A modified RS232 interface provides commercial power to the message receiver in lieu of battery power supply. The data received by the message receiver is fed through the RS-232 interface in a modifiable format (e.g., changeable baud rate, parity, etc.) which can then be transmitted to a computer screen 240, a computer text printer 250, or another PC or mini computer 255 for use in other applications.

In one particular embodiment, transmission by the radio common carrier is replaced by a lease line wherein a modem transmits data directly to the secondary service answering point, e.g., remote site.

4.1 Calling Party Identification Process

Once the calling party identifier or automatic number identification (ANI) has been decoded and presented to the computer 150, e.g. a Microvax 3100, a query is made to the Southwestern Bell Telephone Company Data Management System or ALI (Automatic Location Identification) Database. Returned from that database is the ALI which includes, but is not limited to the following fields: (1) the calling party identifier or ANI; (2) the address, including the block number, street name, subaddress such as apartment, trailer, suite, and the city and state; (3) the time of day and the date of the call; (4) the caller's class of telephone service such as residential, business, PBX or mobile; (5) the Emergency Service Number (ESN) which is a three digit code that can represent a geopolitical jurisdiction; (6) the subscriber's name; and (7) the billing telephone number.

This information is parsed into individual fields of concern. Specifically, ESN, ANI, and Class of Service. The ESN describes information about the caller's area such as the three common public safety service providers—law enforcement agency, fire suppression agency, and emergency medical service provider.

Next, a query is made of the on-site ESN database 202 which returns the phone number and pager number of the agencies listed in the ESN database, for that call. This information is displayed on the calltaker's computer screen.

The information in the class-of-service field dictates further logic based on its value. For instance, if the class-of-service is "MOBIL", the computer 150 would generate a computerized map of the cellular site coverage area from which the 911 telephone call originated. Once the call taker has determined that the information is to be transmitted, they depress a function key, also referred to as a "Hot Key."

The design of a "Hot Key" is very different from a standard keyboard key in that the key that triggers transmission of data to the fire service is a red key with a graphic of a flame. The "Hot Key" that triggers transmission of data to an emergency medical service provider is an orange key with a Star Of Life graphic and the "Hot Key" that triggers transmission data to a law enforcement provider would be a blue key with a badge graphic.

Once a hot key is depressed, the computer 150 typically formats: 1) the caller's telephone number, 2) the caller's complete address, 3) the time of day, 4) the date, 5) the caller's class of service, 6) the caller's ESN, 7) the subscriber's name, and 8) the remote pager's telephone number, and 9) the billing telephone number. Also available for inclusion is any comments that the calltaker wishes to insert such as "caller unable to speak, possibly choking" or "disturbance" or "fire reported at this address."

Once the data is formatted it is automatically transmitted via a dedicated/leased data line to the radio common carrier or the paging company. The paging company assigns a priority which, in the case of 9-1-1 service, would be a top priority and delivers the data for RF transmission.

Once transmitted, the data is received by an alphanumeric message receiver 230 such as a Motorola Adviser Pager Message Receiver. The message receiver decodes the data and delivers it via an RS-232 interface 235 to one or more peripheral devices such as, for example a video display unit 240, a printer 245, or another computer 250.

It should be noted that the term "subscriber" refers to an individual or entity that is listed in a telephone company's ALI database. This may or may not represent the identity of the actual calling party. The actual caller refers to the individual placing the telephone call for service. The subscriber refers to the actual bill payer for that telephone service as listed in a telephone company's billing records.

4.2 Summary

The computer executed method of the invention as described herein accomplishes delivery of integrated data to remote sites or personnel. For example, remote personnel could be in a vehicle, on an airplane or anywhere a pager can be activated.

Given the ability to decode calling party ID, information is gathered by a query or queries to one or more databases, assembled, augmented, formatted, and automatically transmitted to said remote site or personnel.

Some of the benefits of the invention include: 1) speed of delivery, most transactions from call initiation to delivery of data to the remote site can be accomplished in less than 15 seconds; 2) accuracy, integration of computer based database with computer based data transmission eliminates the need to manually enter or re-enter information for each call, thus saving valuable time and reducing the potential for human data entry error; 3) statistical analysis and management reporting, each transaction is recorded for future research and statistical analysis; and 4) cost, invention can be PC based and utilizes existing radio common carrier networks which are inexpensive and widely and readily available. Prior art implementation of similar systems most often use large expensive computing facilities, dedicated radio transmission facilities, and lack the integration between calling party decoding hardware, computerized databases and data transmission hardware.

4.3 Some Potential Uses of Invention

While this disclosure describes an implementation for a 9-1-1 process, the inventive concept is not limited thereto. Any organization in the service industry that relies on a dispatch types of operations could enjoy the merits of this invention. Some potential users include service repair technicians, delivery services, courier services, transportation services, public safety agencies including police, fire, and emergency medical service providers in which the ability to relay such information as hazard database information, premise history information or patient medical information is beneficial.

For example, a particular law firm calls their copy machine vendor whom they have contracted to provide several copy machines within the firm. A machine on the third floor breaks and is in need of repair. The receptionist at the law firm would place a telephone call for service to the copy machine vendor—the calltaker—whose premise equipment would decode the calling party identifier (e.g., the law firm's telephone number), automatically retrieve and display the account information for that law firm on a copy machine vendor's computer screen. Such account information may include a listing of all equipment installed/maintained by the copy machine vendor and related information such as a copier model number, serial number, or equipment type. This information could then be integrated with additional information entered by the calltaker such as the nature of the incident and whether it's critical or non-critical. This information would then be integrated, formatted and transmitted to a service technician's pager via a radio common carrier. This would let the service technician know the type of equipment he/she would be working on and the exact location of the customer so that he/she could take with him the necessary parts based on the information received.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

11 29 93

5.   APPENDIX A

```
IDENTIFICATION DIVISION.
PROGRAM-ID.  SPSAP.
AUTHOR.  RAM BUSINESS SOLUTIONS
DATE-COMPILED.
*
*
*    FUNCTION - THIS PROGRAM IS USED TODISPLAY DATA TO A VOLUNTEER AGENCY
*
*    PROGRAM NARRATIVE -
*
*    THIS PROGRAM WILL BE USED TO SEND DATA TO THE VOLUNTEER AGENCY. ANY DATA
*    TO BE SENT WILL BE SENT TO A VOLUNTEER FILE (VOLMAS). THESE CALLS WILL BE
*    SENT TO THE FILE BY THE PAGE SELECT PROGRAM. THE SPSAP PROGRAM WILL
*    CONSTANTLY MONITOR THE FILE FOR DATA. WHEN IT FINDS ONE THERE IT WILL DIAL
*    THE VOLUNTEER AGENCY AND SEND A SERIES OF RECORDS TO THEM.
*    AFTER THIS IS COMPLETED, THE PROGRAM WILL CHECK TO SEE IF
*    THERE ARE ANY OTHER PAGES TO BE SENT. IFM NOT, THE CALL WILL BE DISCONNECTED.
*
*    THIS PROGRAM WILL RUN AS A STAND ALONE PROCESS.
**
*****************************************************************************
*    Skeleton - General Batch Extract
*
*    This skeleton allows the user to perform functions normally found in batch
*    processing.  It allows the user the three major functions found in batch
*    processing in a loop function.  These functions are get (READ) data, process
*    data, put (WRITE) data.  The process is repeated until a switch is set
*    to indicate no further processing.  This is the skeleton used for all
*    processing not involving form I/O. The 9000 paragraphs, needed to do the
*    file I/O, has to be hard coded in if any file I/O is performed.
*
*    MAJOR CONTROL FIELDS:
*
*        WS-PROCESSING-SW        Move WS-STOP-PROCESSING to this switch in
*                                1000-USER-HOUSEKEEPING, 2000-GET-DATA,
*                                2100-PROCESS-DATA,or 2200-PUT-DATA to stop
*                                furthur processing of GET, PROCESS and PUT.
*        WS-WRITE-SW             Move WS-DONT-WRITE to this switch in
*                                2100-PROCESS-DATA to skip over 2200-PUT-DATA
*                                for that occurance of the GET, PROCESS and PUT
*                                loop (i.e. skip a record but continue
*                                processing) This switch is reset by the
*                                skeleton after 2000-GET-DATA and before
*                                2100-PROCESS-DATA.
*****************************************************************************
*
ENVIRONMENT DIVISION.
CONFIGURATION SECTION.
SPECIAL-NAMES.
DATA DIVISION.
WORKING-STORAGE SECTION.
*
*   INTERNAL SWITCHES AND SCRATCH
**
COPY "CPYLIB:IOSTATWS".
COPY "CPYLIB:IOFUNCTWS".
COPY "CPYLIB:ERRORWS".
COPY "CPYLIB:VOLIOWS".
COPY "CPYLIB:VOLHIOWS".
COPY "CPYLIB:PTIOWS".
```

11 29 93

```
1    *
2    01  WS-PROCESSING-SW           COMP-1 VALUE ZERO.
3        88  WS-PROCESSING-COMPLETE VALUE 1.
4    01  WS-WHICH-TIME              PIC X(001).
5        88  FIRST-TIME             VALUE "Y".
6    01  WS-STOP-PROCESSING         COMP-1 VALUE 1.
7    *
8    01  WS-EMPNO                   PIC X(006) VALUE "SPSAP".
9    01  WS-CALL-STREET-NO.
10       03  FILLER                 PIC X(007) VALUE SPACE.
11       03  WS-CALL-STREET-NO-8    PIC X(001) VALUE SPACE.
12       03  FILLER                 PIC X(001) VALUE SPACE.
13   01  WS-ERR-MSG.
14       03  WS-ERR-MSG-NUMBER      PIC X(004).
15       03  FILLER                 PIC X(002) VALUE SPACE.
16       03  ws-err-msg-text        PIC X(040).
17       03  WS-ERR-MSG-DATA        PIC X(010).
18       03  WS-ERR-DATE-TIME       PIC X(024).
19   *
20   01  WS-DISPLAY-BUFFER          PIC X(400).
21   01  WS-RECEIVE-BUFFER          PIC X(400).
22   01  WS-UNSTRING-BUFFER1        PIC X(400).
23   01  WS-UNSTRING-BUFFER2        PIC X(400).
24   01  WS-UNSTRING-BUFFER3        PIC X(400).
25   01  WS-UNSTRING-BUFFER4        PIC X(400).
26   01  WS-DELIM-1                 PIC X(001).
27   01  WS-DELIM-2                 PIC X(001).
28   01  WS-DELIM-3                 PIC X(001).
29   01  WS-DELIM-4                 PIC X(001).
30   01  WS-COUNT-1                 PIC 9(003) COMP.
31   01  WS-COUNT-2                 PIC 9(003) COMP.
32   01  WS-COUNT-3                 PIC 9(003) COMP.
33   01  WS-COUNT-4                 PIC 9(003) COMP.
34   01  WS-READ-POINTER            PIC 9(003).
35   01  WS-TALLY                   PIC 9(003) COMP.
36   *
37   01  WS-MESSAGE-KEY             PIC X(004).
38   01  WS-MESSAGE-SUB             PIC X(004).
39   *
40   COPY "CPYLIB:WSMODEMPORT".
41   *
42   COPY "CPYLIB:WSMODEM".
43   *
44   COPY "CPYLIB:DTCONVARG".
45   *
46   01  WS-CURRENT-DATE.
47       05  WS-CURRENT-YY          PIC 9(002).
48       05  WS-CURRENT-DDD         PIC 9(003).
49   *
50   01  WS-CURRENT-TIME.
51       05  WS-CURRENT-HH          PIC 9(002).
52       05  WS-CURRENT-MM          PIC 9(002).
53       05  WS-CURRENT-SS          PIC 9(002).
54       05  FILLER                 PIC X(002).
55   *
56   01  WS-CURRENT-SECS            PIC 9(006).
57   *
58   01  WS-VOL-SECS                PIC 9(006).
59   *
60   01  WS-ELAPSED-SECS            PIC 9(006).
61   *
62
63   01  WS-ERR-DATE.
64       05  WS-ERR-YEAR            PIC 9(002).
65       05  WS-ERR-MONTH           PIC 9(002).
66       05  WS-ERR-DAY             PIC 9(002).
```

G:\GHEN\PA\GHEN001.PA1                                    PAGE 15

```
 1     *
 2     01   WS-ERR-TIME.
 3          05  WS-ERR-HOURS          PIC 9(002).
 4          05  WS-ERR-MINUTES        PIC 9(002).
 5          05  WS-ERR-SECONDS        PIC 9(002).
 6          05  WS-ERR-HUND           PIC 9(002).
 7     *
 8     01   WS-FORMAT-DATE-TIME.
 9          05  WS-FORM-DT-HOURS      PIC X(002).
10          05  FILLER                PIC X(001)   VALUE ":".
11          05  WS-FORM-DT-MINUTES    PIC X(002).
12          05  FILLER                PIC X(001)   VALUE ":".
13          05  WS-FORM-DT-SECONDS    PIC X(002).
14          05  FILLER                PIC X(003)   VALUE SPACE.
15          05  WS-FORM-DT-MONTH      PIC X(002).
16          05  FILLER                PIC X(001)   VALUE "/".
17          05  WS-FORM-DT-DAY        PIC X(002).
18          05  FILLER                PIC X(001)   VALUE "/".
19          05  WS-FORM-DT-YEAR       PIC X(002).
20     *
21     01   WS-VALID-PORT-DATA        PIC X(001) VALUE SPACES.
22          88  INVALID-PORT-DATA     VALUE "N".
23     *
24     01   WS-OK-FLAG                PIC X(001) VALUE SPACES.
25          88  OK                    VALUE "Y".
26     *
27     01   WS-DATA-SENT              PIC X(001) VALUE "N".
28     01   WS-VOLMAS-FOUND-SW        PIC X(003).
29          88  VOLMAS-FOUND          VALUE "YES".
30          88  VOLMAS-NOT-FOUND      VALUE "NO".
31     *
32     01   TRY-AGAIN-CTR             COMP-1 VALUE ZERO.
33     01   SKIP-CTR                  COMP-1 VALUE ZERO.
34     01   DELAY                     COMP-1 VALUE ZERO.
35     *
36     01   XON                       PIC X(002) VALUE "^Q".
37     01   CR                        PIC X(001) VALUE "
38          ".
39     01   LF                        PIC X(001) VALUE "
40          ".
41     *
42     *** FIELDS FOR FORMATTED SCREEN DISPLAY ***
43     *
44
45     01   DATE-TIME-DISP.
46          05   TIME-DISP.
47               10  TIME-HH                PIC X(002).
48               10  FILLER                 PIC X(001) VALUE ":".
49               10  TIME-MM                PIC X(002).
50               10  FILLER                 PIC X(001) VALUE ":".
51               10  TIME-SS                PIC X(002).
52          05   FILLER                     PIC X(003) VALUE SPACES.
53          05   DATE-DISP.
54               10  DATE-MM                PIC X(002).
55               10  FILLER                 PIC X(001) VALUE "/".
56               10  DATE-DD                PIC X(002).
57               10  FILLER                 PIC X(001) VALUE "/".
58               10  DATE-YY                PIC X(002).
59     *
60     01   WS-TIME.
61          05  WS-TIME-HH                  PIC X(002).
62          05  WS-TIME-MM                  PIC X(002).
63          05  WS-TIME-SS                  PIC X(002).
64          05  WS-TIME-MS                  PIC X(002).
65     *
66     01   WS-DEST                         PIC X(080).
```

```
1       01 WS-SOURCE                          PIC X(080).
2       01 WS-LEN                             PIC 9(002) COMP.
3       01 WS-START-POS                       PIC 9(003) VALUE 0.
4       *
5       PROCEDURE DIVISION.
6       0000-MAINLINE.
7           DISPLAY "SPSAP".
8           INITIALIZE WS-PROCESSING-SW.
9       *
10          PERFORM 1000-USER-HOUSEKEEPING THRU
11                  1099-USER-HOUSEKEEPING-EXIT.
12      *
13      0010-PROCESSING-LOOP.
14      *
15          IF WS-PROCESSING-COMPLETE
16              GO TO 0019-PROCESSING-COMPLETE.
17      *
18          SET EOF-STATUS TO TRUE.
19          PERFORM 2000-START-VOL THRU
20                  2099-START-VOL-EXIT
21              UNTIL GOOD-IO.
22      *
23          IF WS-PROCESSING-COMPLETE
24              GO TO 0019-PROCESSING-COMPLETE.
25      *
26          PERFORM 2100-PROCESS-DATA THRU
27                  2199-PROCESS-DATA-EXIT.
28      *
29          GO TO 0010-PROCESSING-LOOP.
30      *
31      0019-PROCESSING-COMPLETE.
32          STOP RUN.
33      *
34      1000-USER-HOUSEKEEPING.
35      *
36          INITIALIZE           PTIO-PITS-RECORD.
37          MOVE "PROF"       TO PTIO-TABLE-ID.
38          MOVE "VOL_PORT"   TO PTIO-KEYCODE.
39          PERFORM 9100-READ-PT-FILE THRU
40                  9199-READ-PT-FILE-EXIT.
41          IF (GOOD-IO)
42              MOVE PTIO-DESC TO WS-PORT-NAME
43              PERFORM 9000-ASSIGN-PORT-CHAN THRU
44                      9099-ASSIGN-PORT-CHAN-EXIT
45              IF (WS-SUCCESS)
46                  NEXT SENTENCE
47              ELSE
48                  MOVE "8072" TO WS-ERR-MSG-NUMBER
49                                 WS-MESSAGE-KEY
50                  PERFORM 4000-ERROR-MSG THRU
51                          4099-ERROR-MSG-EXIT
52                  MOVE WS-STOP-PROCESSING TO WS-PROCESSING-SW
53          ELSE
54              MOVE "8034" TO WS-ERR-MSG-NUMBER
55                             WS-MESSAGE-KEY
56              PERFORM 4000-ERROR-MSG THRU
57                      4099-ERROR-MSG-EXIT
58              MOVE WS-STOP-PROCESSING TO WS-PROCESSING-SW.
59      *
60      *   SEND CR TO WAKE UP PORT
61      *
62          MOVE SPACES TO WS-BUFFER.
63          MOVE 1 TO WS-BUFFER-SIZE.
64          STRING
65      *       XON DELIMITED BY SIZE
66              CR  DELIMITED BY SIZE
```

```
                INTO WS-BUFFER WITH POINTER WS-BUFFER-SIZE.
            PERFORM 9700-WRITE-PORT THRU
                    9799-WRITE-PORT-EXIT.
        *
        1099-USER-HOUSEKEEPING-EXIT.
            EXIT.
        *
        2000-START-VOL.
        *
        *   CHECK TO SEE IF ANY RECORDS HAVE BEEN WRITTEN TO THE VOLMAS FILE.
        *
            MOVE LOW-VALUES TO VOLIO-PRIME-KEY.
        *
            PERFORM 9200-START-VOL-FILE THRU
                    9299-START-VOL-FILE-EXIT.
            IF GOOD-IO
               NEXT SENTENCE
            ELSE
               ADD 0.1 TO DELAY
               CALL "LIB$WAIT" USING BY REFERENCE DELAY.
        *
            IF DELAY > 5
               MOVE .1 TO DELAY.
        *
        2099-START-VOL-EXIT.
            EXIT.
        *
        2100-PROCESS-DATA.
            PERFORM 9300-RDNXT-VOL-FILE THRU
                    9399-RDNXT-VOL-FILE-EXIT.
            IF NOT GOOD-IO
               GO TO 2199-PROCESS-DATA-EXIT.
            ACCEPT WS-CURRENT-DATE FROM DAY.
            ACCEPT WS-CURRENT-TIME FROM TIME.
            IF VOLIO-LAST-UPD_EMPNO = "PAGING" AND
               (VOLIO-DATE-SENT = WS-CURRENT-DATE AND
                VOLIO-TIME-SENT > WS-CURRENT-TIME) OR
               (VOLIO-DATE-SENT > WS-CURRENT-DATE)
               NEXT SENTENCE
            ELSE
               GO TO 2199-PROCESS-DATA-EXIT.
        *
        *   SEND THE MESSAGE TO PAGENET
        *
            MOVE 0 TO TRY-AGAIN-CTR SKIP-CTR.
            SET WQ-SUCCESS TO TRUE.
            MOVE "N" TO WS-OK-FLAG.
            PERFORM 2300-CHECK-OK THRU
                    2399-CHECK-OK-EXIT
               UNTIL OK OR NOT WQ-SUCCESS OR TRY-AGAIN-CTR > 20.
            IF OK
               PERFORM 3500-SEND-MESSAGE THRU
                       3599-SEND-MESSAGE-EXIT
               GO TO 2100-PROCESS-DATA.
            IF TRY-AGAIN-CTR > 20
               MOVE WS-STOP-PROCESSING TO WS-PROCESSING-SW.
            PERFORM 2300-MOVE-TO-HIST THRU
                    2399-MOVE-TO-HIST-EXIT.
        2199-PROCESS-DATA-EXIT.
            EXIT.
        *
        2200-PUT-DATA.
        2299-PUT-DATA-EXIT.
            EXIT.
        *
        2300-CHECK-OK.
```

```
                                                                                11 29 93

1   * CHECK PRIOR READ
2       IF WS-BUFFER(1:18) = "Enter pager ID(s):"
3           MOVE "Y" TO WS-OK-FLAG
4           GO TO 2399-CHECK-OK-EXIT.
5   *
6       PERFORM 9800-READ-PORT THRU
7               9899-READ-PORT-EXIT.
8   *
9   *   WE WILL CHECK TEN TIMES FOR A READY MESSAGE, IF NONE, EXIT OUT OF
10  *      THIS PARAGRAPH.
11  *
12      IF WS-BUFFER(1:18) = "Enter pager ID(s):"
13          MOVE "Y" TO WS-OK-FLAG
14          GO TO 2399-CHECK-OK-EXIT.
15  *
16  * TRY TO GET A VALID RESPONSE SKIPPING ALL SPURIOUS CR/LF
17  *
18  *       ADD 1 TO TRY-AGAIN-CTR.
19  *       IF WS-BUFFER = SPACES AND SKIP-CTR < 3
20  *           ADD 1 TO SKIP-CTR
21  *           GO TO 2399-CHECK-OK-EXIT.
22  *
23  *       MOVE 0 TO SKIP-CTR.
24          MOVE SPACES              TO WS-BUFFER.
25          MOVE 1                   TO WS-BUFFER-SIZE.
26          STRING
27  *           XON                  DELIMITED BY SIZE
28              CR                   DELIMITED BY SIZE
29              INTO WS-BUFFER WITH POINTER WS-BUFFER-SIZE.
30          PERFORM 9700-WRITE-PORT THRU
31                  9799-WRITE-PORT-EXIT.
32  *
33  2399-CHECK-OK-EXIT.
34      EXIT.
35  *
36  *************************************************************************
37  2300-MOVE-TO-HIST.
38      ACCEPT WS-CURRENT-DATE FROM DAY.
39      ACCEPT WS-CURRENT-TIME FROM TIME.
40      COMPUTE WS-CURRENT-SECS =
41          ((WS-CURRENT-YY * 365 * 1440) + (WS-CURRENT-DDD * 1440) +
42           (WS-CURRENT-HH * 60) + WS-CURRENT-MM) * 60.
43      COMPUTE WS-VOL-SECS =
44          ((VOLIO-LAST-UPD-YY * 365 * 1440) + (VOLIO-LAST-UPD-DDD * 1440) +
45           (VOLIO-LAST-UPD-HH * 60) +  VOLIO-LAST-UPD-MM) * 60.
46      SUBTRACT WS-VOL-SECS FROM WS-CURRENT-SECS GIVING WS-ELAPSED-SECS.
47  *
48  * IF CALL CANNOT BE SENT AFTER 1.5 MINUTES, MOVE CALL TO HISTORY
49  *
50      IF WS-ELAPSED-SECS > 90
51          MOVE "N" TO WS-DATA-SENT
52          PERFORM 9000-MOVE-TO-HIST THRU
53                  9099-MOVE-TO-HIST-EXIT.
54  2399-MOVE-TO-HIST-EXIT.
55      EXIT.
56  *
57  3000-PRESENT-TOTALS.
58  3099-PRESENT-TOTALS-EXIT.
59      EXIT.
60  *
61  3100-USER-WRAPUP.
62      DISPLAY "END SPSAP".
63  3199-USER-WRAPUP-EXIT.
64      EXIT.
65  *
66  3500-SEND-MESSAGE.

G:\GHEN\PA\GHEN001.PA1                                              PAGE 19
```

```
 1              MOVE VOLIO-CALL-TIME TO WS-TIME.
 2              MOVE WS-TIME-HH     TO TIME-HH.
 3              MOVE WS-TIME-MM     TO TIME-MM.
 4              MOVE WS-TIME-SS     TO TIME-SS.
 5       *
 6       *   FORMAT DATE OF CALL *
 7       *   CONVERT JULIAN CALL DATE TO CALENDAR DATE *
 8       *
 9              SET DTCONV-JULIAN-TO-CALENDAR     TO TRUE.
10              MOVE VOLIO-CALL-DATE              TO WS-DTCONV-JULIAN-DATE.
11              CALL "DTCONV" USING WS-DTCONV-ARGUMENTS.
12              MOVE WS-DTCONV-CLNDR-MM           TO DATE-MM.
13              MOVE WS-DTCONV-CLNDR-DD           TO DATE-DD.
14              MOVE WS-DTCONV-CLNDR-YY           TO DATE-YY.
15       *
16              MOVE SPACE TO WS-BUFFER.
17              MOVE 1     TO WS-BUFFER-SIZE.
18       *
19       *   MANUAL PAGE DENOTED BY "M"
20       *
21       *      IF VOLIO-DATA-SENT = "M"
22                 STRING VOLIO-PAGER-PHONE-EXCH  DELIMITED BY SIZE
23                        VOLIO-PAGER-PHONE-LINE  DELIMITED BY SIZE
24                        CR                      DELIMITED BY SIZE
25                   INTO WS-BUFFER WITH POINTER WS-BUFFER-SIZE.
26              PERFORM 9700-WRITE-PORT THRU
27                      9799-WRITE-PORT-EXIT.
28       *
29       * ECHO BACK OF PAGER ID, WE READ PORT AND THROW AWAY*
30       *
31              PERFORM 9800-READ-PORT THRU
32                      9899-READ-PORT-EXIT.
33
34              PERFORM 9800-READ-PORT THRU
35                      9899-READ-PORT-EXIT.
36              IF WS-BUFFER(1:10) = "Record not" or
37                 WS-BUFFER(1:7)  = "Illegal" OR
38                 WS-BUFFER(1:5)  = "Error"
39                 MOVE "8008" TO WS-ERR-MSG-NUMBER
40                 MOVE "BAD PAGER ID" TO WS-ERR-MSG-TEXT
41                 MOVE VOLIO-PAGER-PHONE  TO WS-ERR-MSG-DATA
42                 PERFORM 4000-ERROR-MSG THRU
43                         4099-ERROR-MSG-EXIT
44                 PERFORM 2300-MOVE-TO-HIST THRU
45                         2399-MOVE-TO-HIST-EXIT
46                 GO TO 3599-SEND-MESSAGE-EXIT.
47       *
48       *** FORMAT VOLUNTEER SCREEN LAYOUT *
49       *
50              IF WS-BUFFER(1:11) = "Enter Alpha"
51                 NEXT SENTENCE
52              ELSE
53                 MOVE "8089" TO WS-ERR-MSG-NUMBER
54                             WS-MESSAGE-KEY
55                 MOVE "EXPECTED-> Enter Alpha" TO WS-ERR-MSG-TEXT
56                 MOVE SPACE                    TO WS-ERR-MSG-DATA
57                 PERFORM 4000-ERROR-MSG THRU
58                         4099-ERROR-MSG-EXIT
59                 PERFORM 2300-MOVE-TO-HIST THRU
60                         2399-MOVE-TO-HIST-EXIT
61                 GO TO 3599-SEND-MESSAGE-EXIT.
62       *
63       * MOVE STREET ADDRESS TO LEFT
64       *
65              MOVE VOLIO-CALL-STREET-NO TO WS-CALL-STREET-NO.
```

11 29 93

```
1    *    IF WS-CALL-STREET-NO = SPACE
2    *        GO TO 3500-STREET-NO-SKIP.
3    *3500-STREET-NO-LOOP.
4    *    IF WS-CALL-STREET-NO(1:1) = SPACE
5    *        MOVE WS-CALL-STREET-NO(2:8) TO WS-CALL-STREET-NO(1:7)
6    *        MOVE SPACE TO WS-CALL-STREET-NO-8
7    *        GO TO 3500-STREET-NO-LOOP.
8    *
9    *3500-STREET-NO-SKIP.
10        MOVE SPACE TO WS-BUFFER.
11        MOVE 1     TO WS-BUFFER-SIZE.
12   *
13        IF VOLIO-LAST-UPD-EMPNO = "PAGING" OR "PAGER"
14            STRING
15                VOLIO-CALL-COMMENTS    DELIMITED BY "  "
16                INTO WS-BUFFER WITH POINTER WS-BUFFER-SIZE
17        ELSE
18            STRING
19                "("                    DELIMITED BY SIZE
20                VOLIO-CALL-AREA-CODE   DELIMITED BY SIZE
21                ") "                   DELIMITED BY SIZE
22                VOLIO-CALL-PHONE-EXCH  DELIMITED BY SIZE
23                "-"                    DELIMITED BY SIZE
24                VOLIO-CALL-PHONE-LINE  DELIMITED BY SIZE
25                " "                    DELIMITED BY SIZE
26                DATE-TIME-DISP         DELIMITED BY SIZE
27                LF                     DELIMITED BY SIZE
28                WS-CALL-STREET-NO      DELIMITED BY SIZE
29                VOLIO-CALL-HOUSE-SUFFIX DELIMITED BY SIZE
30                " "                    DELIMITED BY SIZE
31                VOLIO-CALL-DIRECTION   DELIMITED BY SIZE
32                " "                    DELIMITED BY SIZE
33                VOLIO-CALL-STREET-NAME DELIMITED BY "  "
34                " "                    DELIMITED BY SIZE
35                VOLIO-LOCATION         DELIMITED BY SIZE
36                LF                     DELIMITED BY SIZE
37                VOLIO-CALL-CITY        DELIMITED BY SIZE
38                VOLIO-CALL-STATE       DELIMITED BY SIZE
39                " "                    DELIMITED BY SIZE
40                VOLIO-ESN              DELIMITED BY SIZE
41                " "                    DELIMITED BY SIZE
42                VOLIO-CLASS-OF-SERVICE DELIMITED BY SIZE
43                LF                     DELIMITED BY SIZE
44                VOLIO-CUSTOMER-NAME    DELIMITED BY SIZE
45                " "                    DELIMITED BY SIZE
46                VOLIO-BILL-PHONE-EXCH  DELIMITED BY SIZE
47                "-"                    DELIMITED BY SIZE
48                VOLIO-BILL-PHONE-LINE  DELIMITED BY SIZE
49                INTO WS-BUFFER WITH POINTER WS-BUFFER-SIZE.
50   *
51        IF VOLIO-DATA-SENT = "M" or VOLIO-LAST-UPD-EMPNO = "NOTIFY"
52            STRING
53                LF                     DELIMITED BY SIZE
54                VOLIO-CALL-COMMENTS    DELIMITED BY "  "
55                CR                     DELIMITED BY SIZE
56                INTO WS-BUFFER WITH POINTER WS-BUFFER-SIZE
57        ELSE
58            STRING
59                CR                     DELIMITED BY SIZE
60                INTO WS-BUFFER WITH POINTER WS-BUFFER-SIZE.
61   *
62        PERFORM 9700-WRITE-PORT THRU
63                9799-WRITE-PORT-EXIT.
64   *
65   * ECHO ALPHANUMERIC MSG
66   *
```

G:\GHEN\PA\GHEN001.PA1                                    PAGE 21

```
            PERFORM 9800-READ-PORT THRU
                    9899-READ-PORT-EXIT.
      *
            DISPLAY "BUFFER IN = " WS-BUFFER(1:60).
      *
            MOVE "Y" TO WS-DATA-SENT.
            PERFORM 9000-MOVE-TO-HIST THRU
                    9099-MOVE-TO-HIST-EXIT.
      *
       3599-SEND-MESSAGE-EXIT.
            EXIT.
      *
       4000-ERROR-MSG.
            ACCEPT WS-ERR-DATE FROM DATE.
            ACCEPT WS-ERR-TIME FROM TIME.
            MOVE WS-ERR-YEAR        TO WS-FORM-DT-YEAR.
            MOVE WS-ERR-MONTH       TO WS-FORM-DT-MONTH.
            MOVE WS-ERR-DAY         TO WS-FORM-DT-DAY.
            MOVE WS-ERR-HOURS       TO WS-FORM-DT-HOURS.
            MOVE WS-ERR-MINUTES     TO WS-FORM-DT-MINUTES.
            MOVE WS-ERR-SECONDS     TO WS-FORM-DT-SECONDS.
            MOVE WS-FORMAT-DATE-TIME TO WS-MESSAGE-SUB
                                       WS-ERR-DATE-TIME.
            DISPLAY WS-ERR-MSG.
       4099-ERROR-MSG-EXIT.
            EXIT.
      *
       9000-ASSIGN-PORT-CHAN.
      *
      *     ASSIGN THE PORT FOR THE PAGE
      *
            CALL "SYS$ASSIGN" USING BY DESCRIPTOR WS-PORT-NAME
                                   BY REFERENCE  WS-PORT-CHANNEL
                                   OMITTED
                                   OMITTED
                              GIVING WS-COND-VALUE.
       9099-ASSIGN-PORT-CHAN-EXIT.
            EXIT.
      *
       9000-MOVE-TO-HIST.
            MOVE VOLIO-VOL-RECORD TO VOLHIO-VOLH-RECORD.
            MOVE WS-DATA-SENT TO VOLHIO-DATA-SENT.
            ACCEPT VOLHIO-DATE-SENT FROM DAY.
            ACCEPT VOLHIO-TIME-SENT FROM TIME.
      *
            PERFORM 9400-DELETE-VOL-REC THRU
                    9499-DELETE-VOL-REC-EXIT.
            PERFORM 9600-WRITE-VOLH-REC THRU
                    9699-WRITE-VOLH-REC-EXIT.
       9099-MOVE-TO-HIST-EXIT.
            EXIT.
      *
       9100-READ-PT-FILE.
      *
      *     READ PROFILE LFLE FOR PORT NAME ASSIGN TO MODEM PORT
      *
      *
            MOVE "9100"             TO WE-PARA-NAME.
            MOVE "READ"             TO WE-VERB-NAME.
      *
            MOVE WS-IO-READ         TO PTIO-FUNCTION.
            CALL "PTIOUPD".
            MOVE PTIO-FILE-STATUS   TO WS-IO-STATUS.
       9199-READ-PT-FILE-EXIT.
            EXIT.
      *
```

11 29 93

```
1    9200-START-VOL-FILE.
2    *
3            MOVE "9200"                    TO WE-PARA-NAME.
4            MOVE "START"                   TO WE-VERB-NAME.
5    *
6            MOVE WS-IO-START               TO VOLIO-FUNCTION.
7            CALL "VOLIOUPD".
8            MOVE VOLIO-FILE-STATUS         TO WS-IO-STATUS.
9    9299-START-VOL-FILE-EXIT.
10           EXIT.
11   *
12   9300-RDNXT-VOL-FILE.
13   *
14           MOVE "9300"                    TO WE-PARA-NAME.
15           MOVE "READ NEXT"               TO WE-VERB-NAME.
16   *
17           MOVE WS-IO-READ-NEXT-LOCK      TO VOLIO-FUNCTION.
18           CALL "VOLIOUPD".
19   *
20           MOVE VOLIO-FILE-STATUS         TO WS-IO-STATUS.
21   9399-RDNXT-VOL-FILE-EXIT.
22           EXIT.
23   *
24   9400-DELETE-VOL-REC.
25   *
26           MOVE "9400"                    TO WE-PARA-NAME.
27           MOVE "DELETE"                  TO WE-VERB-NAME.
28   *
29           MOVE WS-IO-DELETE              TO VOLIO-FUNCTION.
30           CALL "VOLIOUPD".
31           MOVE VOLIO-FILE-STATUS         TO WS-IO-STATUS.
32   9499-DELETE-VOL-REC-EXIT.
33           EXIT.
34   *
35   9500-WRITE-VOL-REC.
36   *
37           MOVE "9500"                    TO WE-PARA-NAME.
38           MOVE "WRITE"                   TO WE-VERB-NAME.
39   *
40           MOVE WS-IO-WRITE               TO VOLIO-FUNCTION.
41           CALL "VOLIOUPD".
42           MOVE VOLIO-FILE-STATUS         TO WS-IO-STATUS.
43   9599-WRITE-VOL-REC-EXIT.
44           EXIT.
45   *
46   9600-WRITE-VOLH-REC.
47   *
48           MOVE "9600"                    TO WE-PARA-NAME.
49           MOVE "WRITE"                   TO WE-VERB-NAME.
50   *
51           MOVE WS-IO-WRITE               TO VOLIO-FUNCTION.
52           CALL "VOLHIOUPD".
53           MOVE VOLHIO-FILE-STATUS        TO WS-IO-STATUS.
54   9699-WRITE-VOLH-REC-EXIT.
55           EXIT.
56   *
57   9700-WRITE-PORT.
58           DISPLAY "BUFFER OT = " WS-BUFFER(1:60).
59   *       MOVE 1.0 TO DELAY.
60   *       CALL "LIB$WAIT" USING BY REFERENCE DELAY.
61           SUBTRACT 1 FROM WS-BUFFER-SIZE.
62           CALL "SYS$QIOW"        USING OMITTED
63                                  BY VALUE WS-PORT-CHANNEL
64                                  BY VALUE WS-WRITE
65                                  OMITTED
66                                  OMITTED
```

G:\GHEN\PA\GHEN001.PA1                                   PAGE 23

11 29 93

```
 1                              OMITTED
 2                              BY REFERENCE WS-BUFFER
 3                              BY VALUE WS-BUFFER-SIZE
 4                              OMITTED
 5                              OMITTED
 6                              OMITTED
 7                              OMITTED
 8                              GIVING WS-QIO-COND-VALUE.
 9       IF NOT WQ-SUCCESS
10           MOVE "8082" TO WS-ERR-MSG-NUMBER
11                           WS-MESSAGE-KEY
12           MOVE "ERROR WRITING PORT" TO WS-ERR-MSG-TEXT
13           MOVE SPACE               TO WS-ERR-MSG-DATA
14           PERFORM 4000-ERROR-MSG THRU
15                   4099-ERROR-MSG-EXIT
16           MOVE WS-STOP-PROCESSING TO WS-PROCESSING-SW.
17   9799-WRITE-PORT-EXIT.
18       EXIT.
19   *
20   9800-READ-PORT.
21       MOVE SPACES    TO WS-BUFFER.
22       MOVE 1         TO WS-READ-POINTER.
23       MOVE 400       TO WS-BUFFER-SIZE.
24   9800-READ-PORT-LOOP.
25       MOVE 0.5       TO DELAY.
26       CALL "LIB$WAIT" USING BY REFERENCE DELAY.
27       MOVE LOW-VALUES TO WS-UNSTRING-BUFFER1.
28       MOVE SPACE      TO WS-UNSTRING-BUFFER2
29                          WS-UNSTRING-BUFFER3 WS-UNSTRING-BUFFER4.
30       MOVE LOW-VALUES TO WS-RECEIVE-BUFFER.
31       CALL "SYS$QIOW" USING OMITTED
32                             BY VALUE WS-PORT-CHANNEL
33                             BY VALUE WS-READ
34                             OMITTED
35                             OMITTED
36                             OMITTED
37                             BY REFERENCE WS-RECEIVE-BUFFER
38                             BY VALUE WS-BUFFER-SIZE
39                             OMITTED
40                             OMITTED
41                             OMITTED
42                             OMITTED
43                             GIVING WS-QIO-COND-VALUE.
44       IF (NOT WQ-SUCCESS)
45           MOVE "8083" TO WS-ERR-MSG-NUMBER
46                           WS-MESSAGE-KEY
47           MOVE "ERROR READING PORT" TO WS-ERR-MSG-TEXT
48           MOVE SPACE                TO WS-ERR-MSG-DATA
49           PERFORM 4000-ERROR-MSG THRU
50                   4099-ERROR-MSG-EXIT
51           MOVE WS-STOP-PROCESSING TO WS-PROCESSING-SW
52       END-IF.
53       DISPLAY "BUFFER IN = " WS-RECEIVE-BUFFER(1:60).
54       UNSTRING WS-RECEIVE-BUFFER
55           DELIMITED BY
56               CR OR
57               LOW-VALUES
58           INTO WS-UNSTRING-BUFFER1 DELIMITER IN WS-DELIM-1 COUNT IN WS-COUNT-1
59           TALLYING IN WS-TALLY.
60       IF  WS-COUNT-1 = ZERO AND WS-DELIM-1 = CR
61           GO TO 9800-READ-PORT-LOOP.
62       IF WS-COUNT-1 = ZERO AND WS-DELIM-1 = LOW-VALUE
63           GO TO 9899-READ-PORT-EXIT.
64   *
65       IF WS-COUNT-1 > ZERO
66           UNSTRING WS-UNSTRING-BUFFER1 DELIMITED BY LOW-VALUE OR LF
```

G:\GHEN\PA\GHEN001.PA1                                                    PAGE 24

```
                  INTO WS-UNSTRING-BUFFER2
                       WS-UNSTRING-BUFFER3
                       WS-UNSTRING-BUFFER4
             STRING WS-UNSTRING-BUFFER2 DELIMITED BY " "
                    WS-UNSTRING-BUFFER3 DELIMITED BY " "
                    WS-UNSTRING-BUFFER4 DELIMITED BY " "
                INTO WS-BUFFER WITH POINTER WS-READ-POINTER.
     *
     *   DISPLAY "STRING= " WS-READ-POINTER " " WS-BUFFER(1:60).
     *   DISPLAY "B2= " WS-UNSTRING-BUFFER2.
     *   DISPLAY "B3= " WS-UNSTRING-BUFFER3.
     *   DISPLAY "B4= " WS-UNSTRING-BUFFER4.
         IF (WS-DELIM-1 = CR ) AND WS-BUFFER NOT = SPACE
            NEXT SENTENCE
         ELSE
            GO TO 9800-READ-PORT-LOOP.
    9899-READ-PORT-EXIT.
         EXIT.
    ***changes
    ** 12/6/92 ram removed string display, cleaned up debugging
    ** 12/6/92 ram changed expected alpha display
```

6. CLAIMS

What is claimed is:

1. A system for providing data at a remote location comprising:
- a computer at a central site wherein the data to be provided to said remote site is temporarily stored, the computer being programmed to interrogate at least one database in response to a received signal identifying a calling party to extract data associated with the calling party;
- the computer including a memory storage device containing at least one database of pager telephone numbers, the computer being programmed to interrogate the telephone number database to identify at least one pager associated with the calling party;
- a telecommunications link connecting the computer to a radio common carrier transmitter, the computer being programmed to transmit the data to the radio common carrier, wherein the radio common carrier transmits the data via radio frequency in response to the pager telephone number;
- an alphanumeric pager associated with the pager telephone number, the alphanumeric pager being situated at the data transmitted by the receiving the data transmitted by the radio common carrier;
- an RS232 interface electronically connected to said alphanumeric pager; and
- a display device external to said alphanumeric pager and electronically connected to receive and display the data from the pager via the RS232 interface.

2. The system of claim 1 further comprising a storage device external to said alphanumeric pager for storing said data at said remote location.

3. The system of claim 2 wherein said storage device is electrically connected to said RS232 interface.

4. The system of claim 1 wherein said data comprises the telephone number of the calling party, the calling party's name, the calling party's address, the time of day, and the date of the call, and additional information input into said computer by an operator at the central site.

5. The system of claim 1 wherein said telecommunecations link is a dedicated dataline.

6. The system of claim 1 wherein said display device is an integral part of a computer.

7. The system of claim 1 wherein said display device is a terminal screen.

8. The system of claim 1 wherein said display device is a printer.

9. A method for providing data to a remote location comprising:
- receiving at a central site a telephone call which includes an electronic signal encoding a calling party number;
- interrogating one or more computer databases to extract data related to the calling party number,
- interrogating one or more computer databases to identify the telephone number of an alphanumeric pager associated with the calling party, based on the extracted data related to the calling party number;
- receiving additional data from an operator;
- formatting the data related to the calling party number, the alphanumeric pager telephone number and the received additional data into a message;
- transmitting said message from said central site to a central radio common carrier transmitter responsive to the alphanumeric telephone number;
- broadcasting said message from said radio common carrier transmitter to said alphanumeric pager at the remote location;
- decoding said message using said alphanumeric pager;
- transferring said message from said alphanumeric pager to an external display device; and
- displaying said message on the external display device.

10. The method of claim 9 further comprising the step of storing said data at said remote location in a device external to said alphanumeric pager.

11. The method of claim 1 wherein the first interrogating step further comprises extracting the telephone number of the calling party, the calling party's name, the calling party's address, the time of day, and the date.

12. The method of claim 9 wherein the second interrogating step comprises interrogating one or more computer databases to identify the telephone number of a plurality of alphanumeric pagers associated with the calling party, based on the extracted data related to the calling party number.

13. The method of claim 12, prior to the transmitting step further comprising:
- receiving from the operator an indication of the alphanumeric pager to which the message is to be transmitted.

* * * * *

UNITED STATES PATENT AND TRADEMARK OFFICE
CERTIFICATE OF CORRECTION

PATENT NO.   :   5,761,278
DATED        :   June 2, 1998
INVENTOR(S)  :   DAVID L. PICKETT and JOHN R. MELCHER It is certified that error appears in the above-identified patent and that said Letters Patent is hereby corrected as shown below:

In claim 11, column 32, line 30, after the word "claim" delete '1', *insert* --9--therefor.

Signed and Sealed this

Third Day of November, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,761,278
DATED : June 2, 1998
INVENTOR(S) : DAVID L. PICKETT and JOHN R. MELCHER It is certified that error appears in the above-identified patent and that said Letters Patent is hereby corrected as shown below:

In claim 1, column 31, line 25, after the word "the" *insert* --remote location for -- and after the word "for" delete --data transmitted by the-- therefor.

In claim 11, column 32, line 33, after the word "claim" delete --1--, and after the word "claim" *insert* --9--therefor.

Signed and Sealed this

Thirteenth Day of April, 1999

*Attest:*

Q. TODD DICKINSON

*Attesting Officer*   *Acting Commissioner of Patents and Trademarks*